US011879712B1

(12) United States Patent
Moore et al.

(10) Patent No.: US 11,879,712 B1
(45) Date of Patent: Jan. 23, 2024

(54) FIRED CARTRIDGE CASE COLLECTORS AND METHODS OF USE THEREOF

(71) Applicant: Combat Capabilities Development Command, Chemical Biological Center, APG, MD (US)

(72) Inventors: Richard B. Moore, Forest Hill, MD (US); David F Whittaker, Baltimore, MD (US); Kevin S Wallace, Darlington, MD (US); Todd W Bille, Annandale, VA (US); Gregory A Peiffer, Ellicott City, MD (US); Steven M Weitz, Annandale, VA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 690 days.

(21) Appl. No.: 17/064,688

(22) Filed: Oct. 7, 2020

Related U.S. Application Data

(60) Provisional application No. 62/912,274, filed on Oct. 8, 2019.

(51) Int. Cl.
*F42B 39/22* (2006.01)
*G01N 1/04* (2006.01)

(52) U.S. Cl.
CPC .............. *F42B 39/22* (2013.01); *G01N 1/04* (2013.01)

(58) Field of Classification Search
CPC .................................. G01N 1/04; F42B 39/22
USPC ...................... 206/3; 73/864.51, 863; 42/1.01
See application file for complete search history.

(56) References Cited

U.S. PATENT DOCUMENTS

| | | | |
|---|---|---|---|
| 11,543,330 B2* | 1/2023 | Park | G01N 1/04 |
| 2002/0046614 A1* | 4/2002 | Alley | B01L 3/502 |
| | | | 73/864.51 |
| 2002/0178959 A1* | 12/2002 | Rennard | F42B 5/26 |
| | | | 102/430 |
| 2005/0191760 A1* | 9/2005 | Heath | C12N 15/1006 |
| | | | 422/400 |
| 2010/0121046 A1* | 5/2010 | Ahlquist | A61B 10/0038 |
| | | | 536/25.41 |
| 2011/0146420 A1* | 6/2011 | Okada | B01L 3/5021 |
| | | | 73/864.51 |
| 2015/0360222 A1* | 12/2015 | Dannelöv | B01L 3/561 |
| | | | 73/864.51 |

* cited by examiner

*Primary Examiner* — John Cooper
(74) *Attorney, Agent, or Firm* — Ulysses John Biffoni

(57) ABSTRACT

A fired cartridge case collector includes a base having a collection post. The collection post of the base is configured to collect and suspend a fired cartridge case without causing contact to an exterior surface of the fired cartridge case. The fired cartridge case collector also includes a protective envelope having a first end and a second end opposite the first end, wherein the first end of the protective envelope is configured to be removably secured to the base. The protective envelope is configured to prevent contact between an interior surface of the protective envelope and the exterior surface of the fired cartridge case while the protective envelope is removably secured to the base. The fired cartridge case collector permits individual collection, packaging, and non-contact storage of fired gun cartridge cases thereby preserving any DNA or other evidence that may be present.

25 Claims, 4 Drawing Sheets

FIRED CARTRIDGE CASE COLLECTORS AND METHODS OF USE THEREOF

CROSS REFERENCE TO RELATED APPLICATIONS

This application depends from and claims priority to U.S. Provisional Application No. 62/912,274 filed Oct. 8, 2019, the entire contents of which are incorporated herein by reference.

GOVERNMENT INTEREST

The invention described herein may be manufactured, used, and licensed by or for the United States Government.

TECHNICAL FIELD

The present disclosure relates to fired cartridge case collectors and methods of collecting a fired cartridge case with said fired cartridge case collectors. In particular, the present disclosure relates to fired cartridge case collectors that include a base having a collection post configured to collect and suspend a fired cartridge case and a protective envelope, which is configured to prevent contact between an interior surface of the protective envelope and the exterior surface of the fired cartridge case, the protective envelope configured to be removably secured to the base.

BACKGROUND

Traditionally, fired cartridge cases are collected by hand or by instruments that have come into human contact before the fired cartridge case is placed into a sealed envelope. These typical collection assemblies and methods have three major flaws. First, the typical collection assemblies and methods increase the risk of DNA contamination of crucial evidence, such as fired cartridge cases during the commission of a crime. Second, even once placed into a sealed envelope, the evidence often is exposed to the packaging during storage and transportation, which may decrease the amount of DNA residue on the evidence. Finally, multiple cartridge cases are often packaged together, which may also increase the risk of DNA contamination or cross-contamination. Therefore, these typical collection assemblies and methods may result in the potential loss of potentially useful DNA evidence during and after collection.

From the aforementioned, it is apparent that typical collection assemblies and methods may result in DNA contamination of potentially crucial evidence. As such, alternative collection assemblies and methods for fired cartridge cases are desirable. These cartridge case collectors may include a base, having a collection post, and a protective envelope. The fired cartridge case collectors allow a user to hold the base such that the collection post is the only element of the cartridge case collector that contacts a fired cartridge case during collection. Then, upon inverting the base, the fired cartridge case becomes suspended on the collection post. Finally, a protective envelope, which is configured to prevent unwanted contact with an external surface of the fired cartridge case, may be removably secured to the base, thereby preserving any DNA evidence on the fired cartridge case.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

It is highly desirable that a fired cartridge case collector, and methods of use thereof allow for a straightforward and rapid collection of a fired cartridge case. Moreover, it is highly desirable that a fired cartridge case collector, and methods of use thereof, allow for users, such as crime scene technicians, to collect fired cartridge cases without coming into direct contact with the item. As such, the fired cartridge case collector disclosed herein includes components allowing for both rapid and indirect collection of fired cartridge cases, thereby preserving any DNA that may be present on the fired cartridge cases during collection.

It is also highly desirable that a fired cartridge case collector, and methods of use thereof, allow for individual packaging and noncontact storage of the fired cartridge case after collection. Such individual packaging and storage ensures that an external surface of a fired cartridge case does not come into contact with other fired cartridge cases or with an interior surface of the packaging itself. As such, the fired cartridge case collector disclosed herein includes components allowing for individual packaging and noncontact storage of fired cartridge cases, thereby preserving any DNA that may be present on the fired cartridge cases after collection.

In some aspects, a fired cartridge case collector may include a base having a post, where the collection post of the base may be configured to collect and suspend a fired cartridge case without causing contact to an exterior surface of the fired cartridge case. The fired cartridge case collector may further include a protective envelope having a first end and a second end opposite the first end, where the first end of the protective envelope may be configured to be removably secured to the base. The protective envelope may be configured to prevent contact between an interior surface of the protective envelope and the exterior surface of the fired cartridge case while the protective envelope is removably secured to the base.

In one or more aspects, a method for collecting a fired cartridge case with a fired cartridge case collector may include contacting an interior surface of a fired cartridge case with a collection post of the fired cartridge case collector, wherein the collection post may be positioned on a base. The method may further include inverting the base of the fired cartridge case collector, such that the fired cartridge case may become suspended on the collection post. The method may further include securing a protective envelope having a first end and a second end opposite the first end onto the base of the fired cartridge case collector, without causing contact between an interior surface of the protective envelope and an exterior surface of the fired cartridge case.

Accordingly, it becomes possible to solve the aforementioned problems and to collect and store a fired cartridge case without contaminating any DNA that may be present on an external surface of the fired cartridge case.

Additional features and advantages of the technology described in the present disclosure will be set forth in the detailed description that follows, and in part will be readily apparent to those skilled in the art from the description or recognized by practicing the technology as described in this disclosure, including the detailed description that follows, as well as the claims.

BRIEF DESCRIPTION OF THE DRAWINGS

For the purpose of illustrating the concepts described in the present disclosure, there is shown in the drawings a form that is exemplary; it being understood, however, the present disclosure is not limited to the precise arrangements and instrumentalities shown. The drawings are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Exemplary aspects will become more fully understood from the detailed description and the accompanying drawings, wherein.

DETAILED DESCRIPTION

Figure 1:
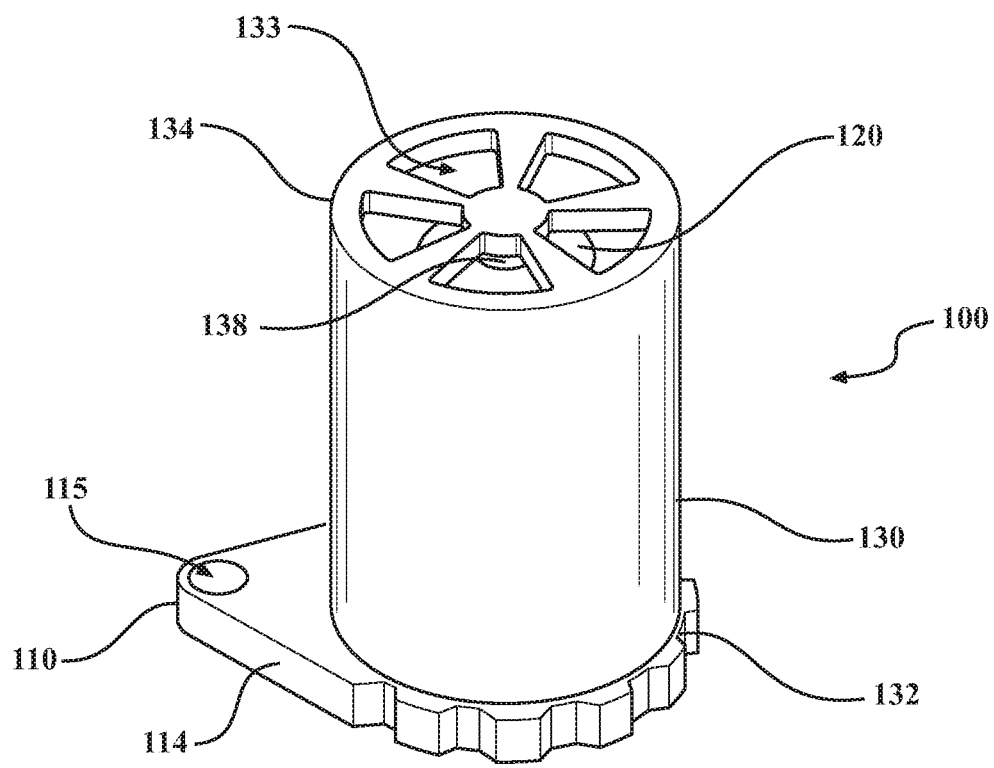
FIG. 1 is an illustration of a fired cartridge case collector, according to one or more embodiments presented.
Figure 2:
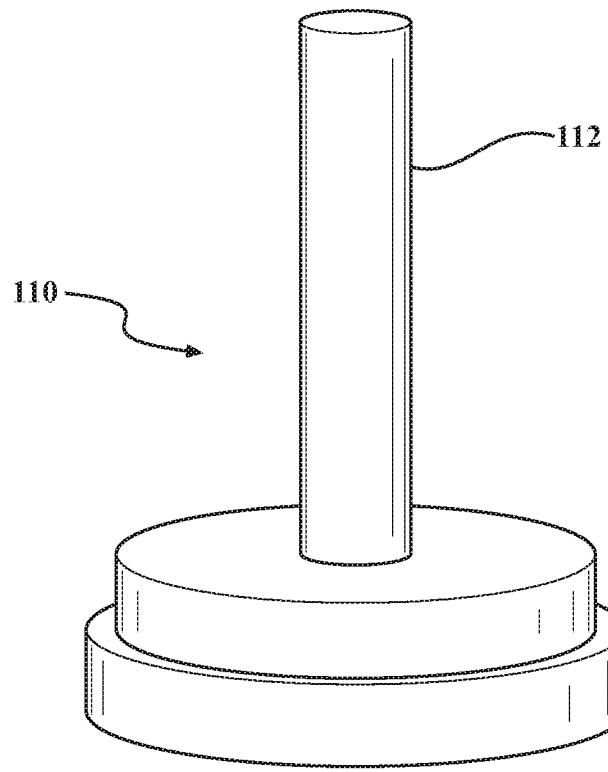
FIG. 2 is an illustration a base of a fired cartridge case collector, according to one or more embodiments presented.
Figure 3:
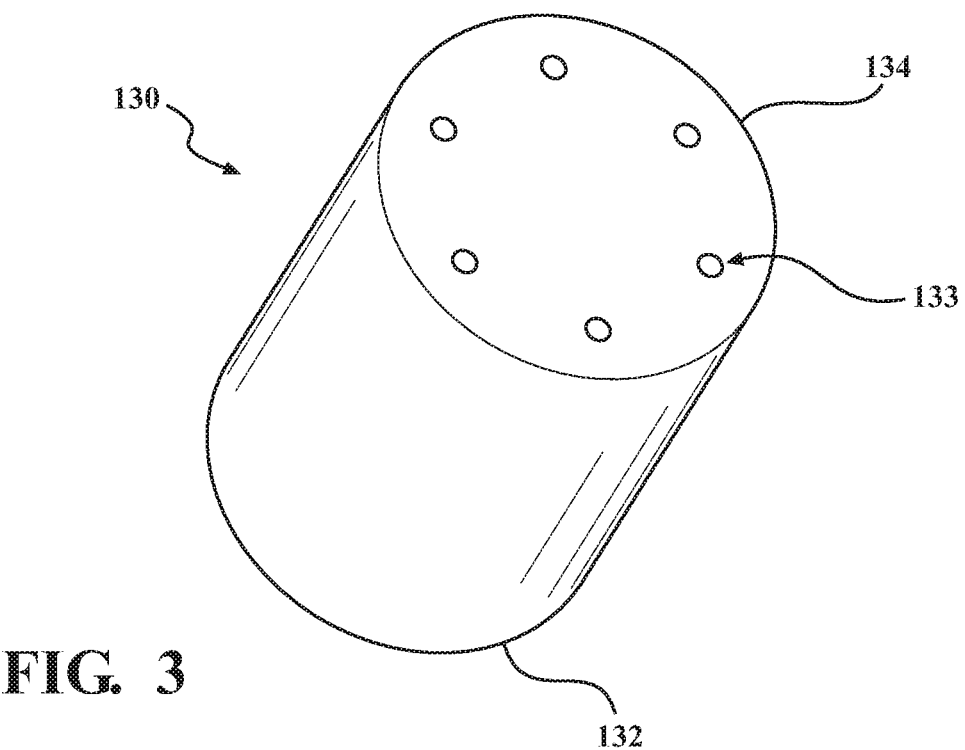
FIG. 3 is an illustration of a protective envelope of a fired cartridge case collector, according to one or more embodiments presented.

Detailed aspects are disclosed herein; however, it is to be understood that the disclosed aspects are merely exemplary in nature and may be embodied in various and alternative forms. The figures are not necessarily to scale. Therefore, specific details disclosed herein are not to be interpreted as limiting, but merely as a representative basis for any aspect of the invention and/or as a representative basis for teaching one skilled in the art to variously employ the present invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Throughout this specification, where publications are referenced the disclosures of these publications in their entireties are hereby incorporated by reference into this application to more fully describe the state of the art to which this invention pertains.

The following terms or phrases used herein have the exemplary meanings listed below in connection with at least one aspect:

The term "fired cartridge case," as used herein, means any cartridge or round of firearm ammunition that has been shot from a gun. Suitable guns capable of producing a fired cartridge case include, but are not limited to, handguns, rifles, long guns, shotguns, carbines, machine guns, sniper rifles, submachine guns, automatic rifles, assault rifles, or any other class or subclass of gun that produces a fired cartridge case.

Referring now to FIGS. 1-8, a fired cartridge case collector 100 may include a base 110 having a collection post 112. The collection post 112 may be configured to collect and suspend a fired cartridge case 120 without causing contact to an exterior surface 122 of the fired cartridge case 120. The fired cartridge case collector 100 may further include a protective envelope 130 having a first end 132 and a second end 134 opposite the first end 132. The first end 132 of the protective envelope 130 may be configured to be removably secured to the base 110. The protective envelope 130 may be configured to prevent contact between an interior surface 136 of the protective envelope 130 and the exterior surface 122 of the fired cartridge case 120 while the protective envelope 130 is removably secured to the base 110 of the fired cartridge case collector 100. Such a configuration may allow a user to collect the fired cartridge case 120 without contaminating any DNA that may be present on the exterior surface 122 of the fired cartridge case 120.

Figure 4:
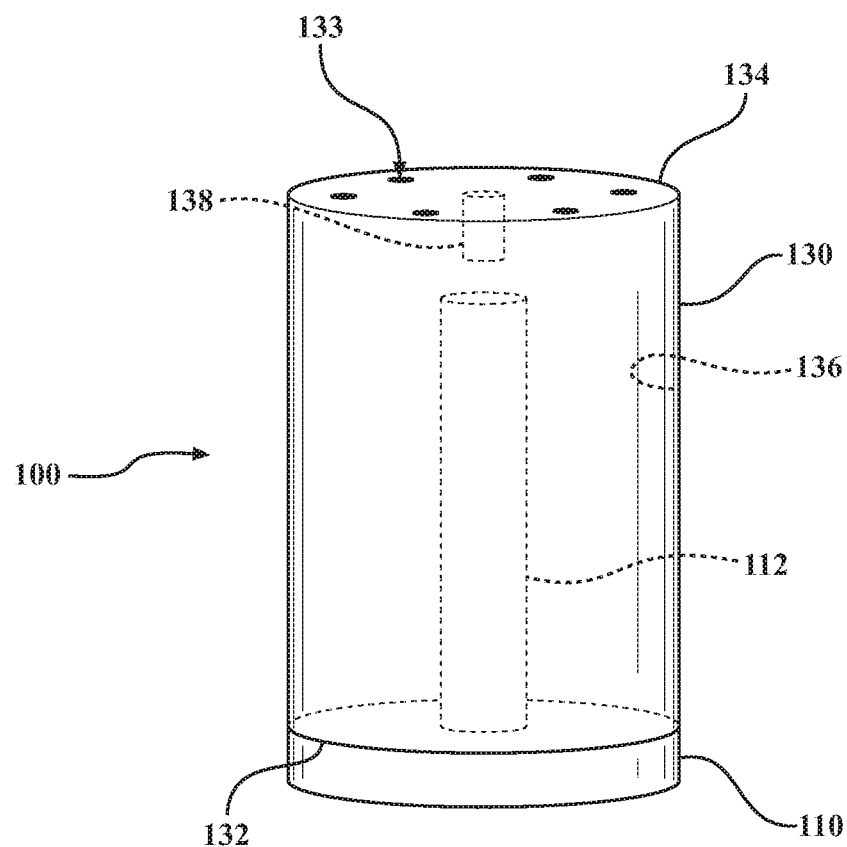
FIG. 4 is a transparent view of a fired cartridge case collector, according to one or more embodiments presented.
Figure 5:
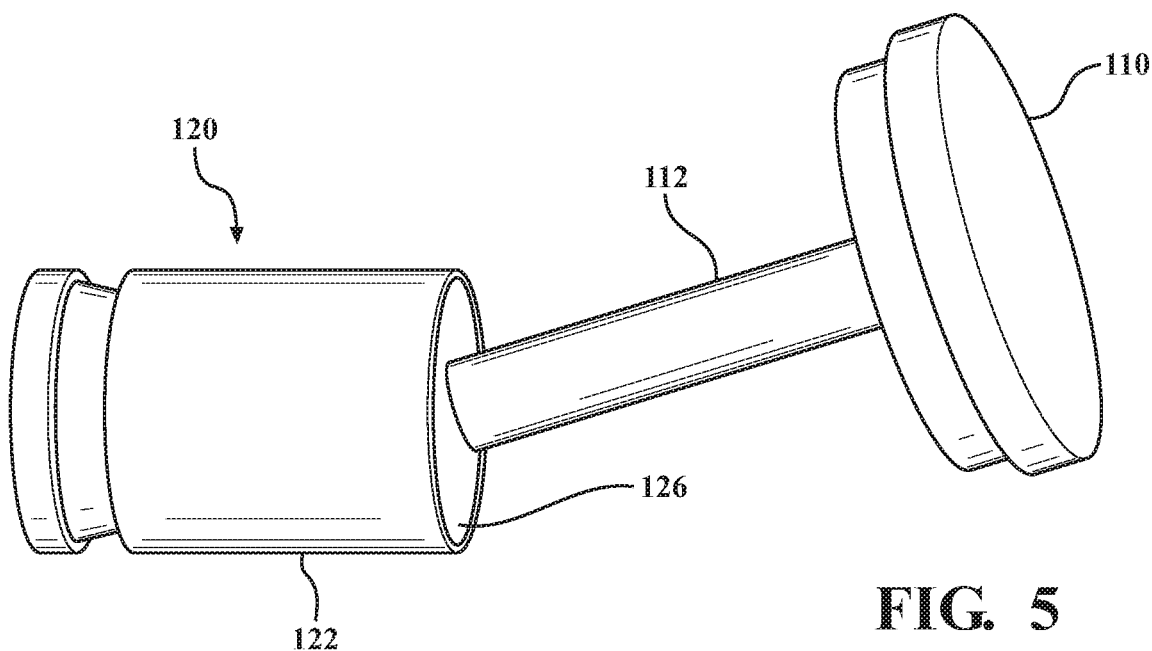
FIG. 5 is an illustration showing the collection of a fired cartridge case with a base of a fired cartridge case collector, according to one or more embodiments presented.
Figure 8:
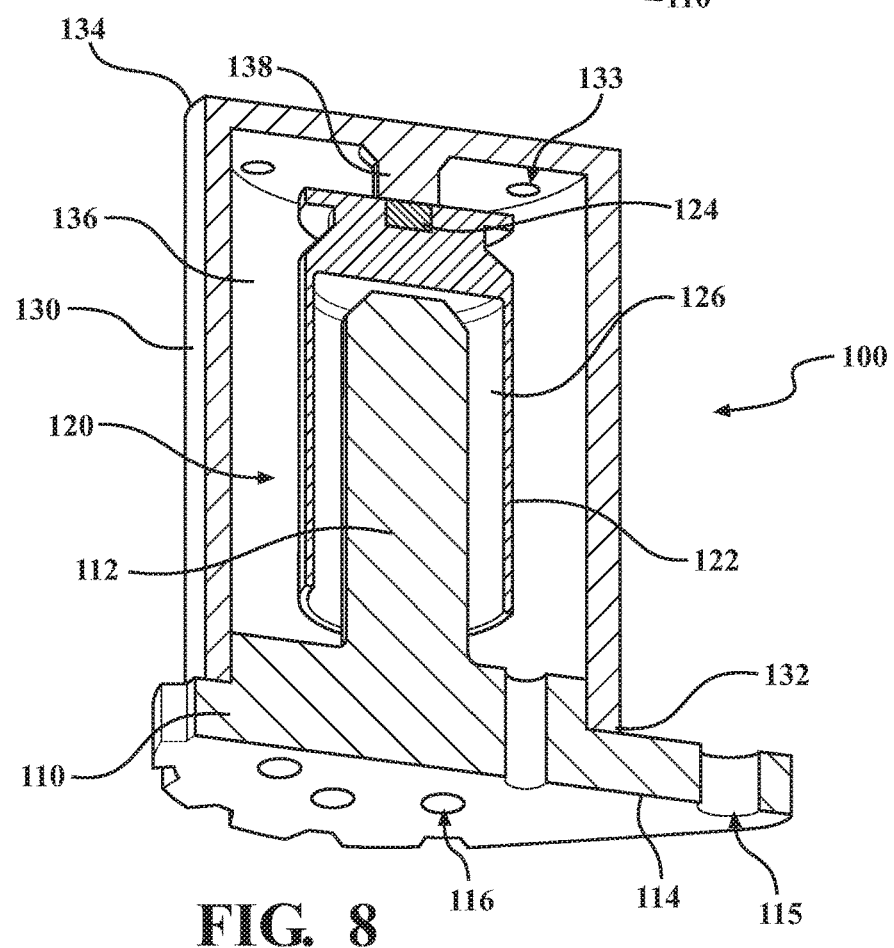
FIG. 8 is a cross-sectional view of a fired cartridge case collector, according to one or more embodiments presented.

Referring now to FIGS. 4 and 8, the second end 134 of the protective envelope 130 may include a securing post 138 configured to contact a firing pin 124, thereby constraining movement of the fired cartridge case 120. When present, the securing post 138 may prevent or eliminate the fired cartridge case 120 from any unwanted movement subsequent to collection, such as during storage or transport of the fired cartridge case collector 100. In one or more embodiments, a surface area of the securing post 138 that is in contact with the exterior surface 122 of the fired cartridge case 120 may substantially equal to a surface area of the firing pin 124 of the fired cartridge case 120. In fact, it is optimal that the surface area of the securing post 138 in contact with the exterior surface 122, such as the firing pin 124, be minimized to the greatest extent possible in order to preserve any potential DNA present on the exterior surface 122 of the fired cartridge case 120 while also reducing unwanted movement of the fired cartridge case 120 to the greatest possible extent.

In one or more embodiments, the collection post 112 may be substantially cylindrical in order to accommodate the substantially cylindrical shape of an interior surface 126 of a typical fired cartridge case. In embodiments, the securing post 138 may be substantially cylindrical in order to accommodate the substantially cylindrical shape of the firing pin 124 of typical fired cartridge cases. In embodiments in which both the collection post 112 and the securing post 138 are substantially cylindrical, a diameter of the collection post 112 is greater than a diameter of the securing post 138. Without being bound by theory, it is believe that such embodiments may preserve the greatest amount of DNA on the fired cartridge case 120 as contact to its exterior surface 122 by the securing post 138 is reduced while maximal support is provided to the suspended fired cartridge case 120 by the collection post 112, thereby eliminating any unwanted movement of the fired cartridge case 120 during storage or transport.

Referring now to FIGS. 1, 3, 4, 7, and 8, the protective envelope 130 may be substantially cylindrical. In other words, the protective envelope 130 may have a tubular body. Such a substantially cylindrical shape of the protective envelope 130 may increase the distance between the exterior surface 122 of the fired cartridge case 120 and the interior surface 136 of the protective envelope 130. Moreover, the substantially cylindrical shape may allow for easier gripping and transport of the fired cartridge case collector 100.

Figure 6:
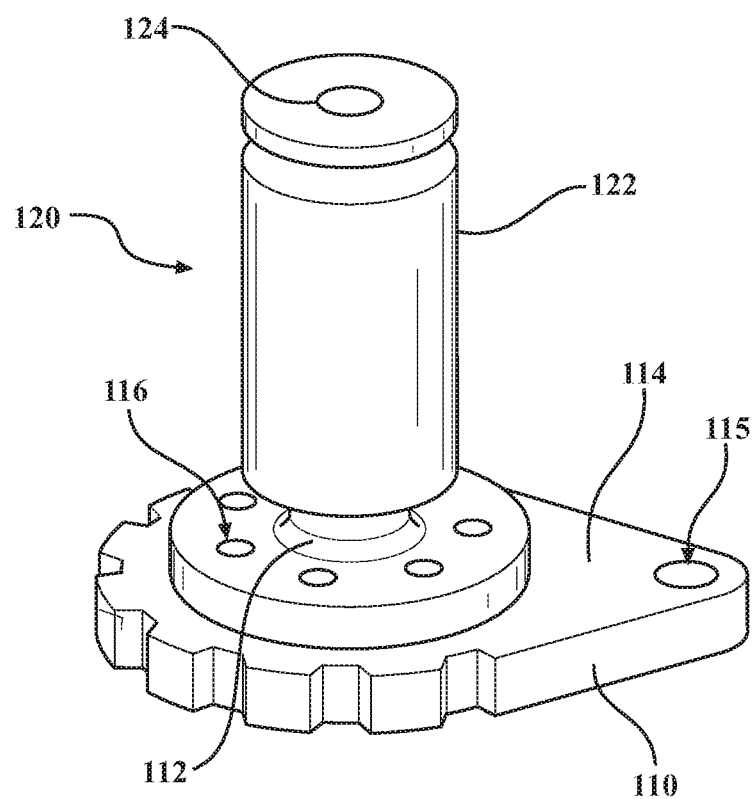
FIG. 6 is an illustration of a fired cartridge case suspended on a collection post of a base of a fired cartridge case collector, according to one or more embodiments presented.
Figure 7:
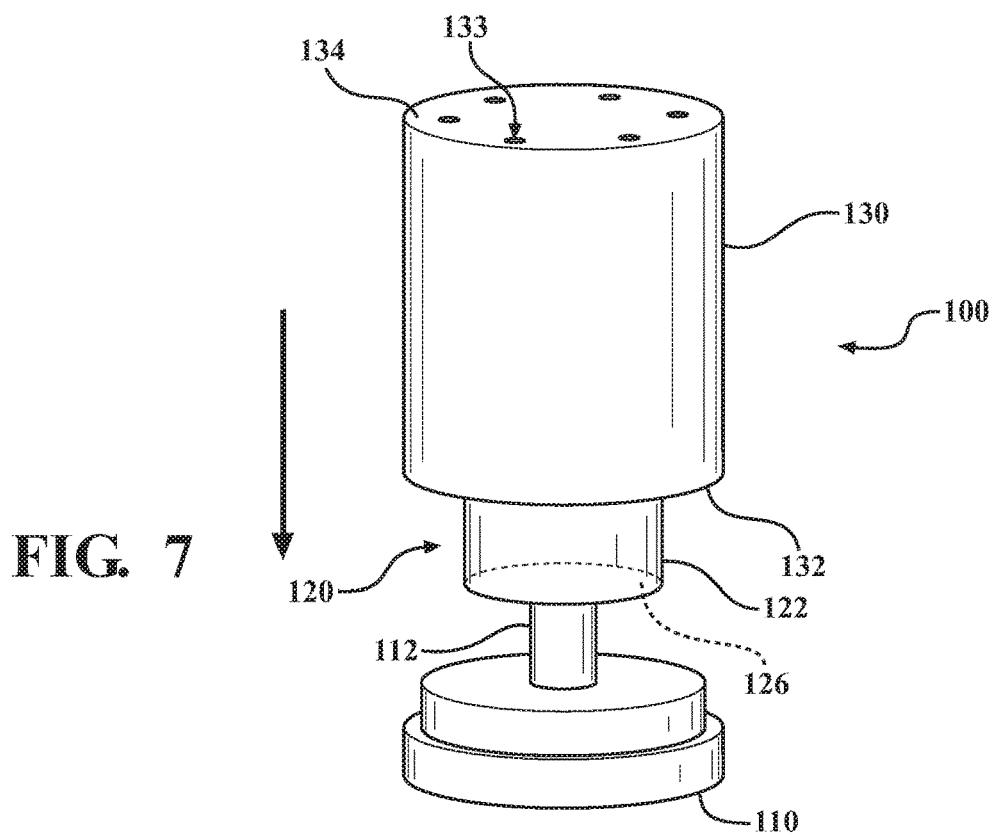
FIG. 7 is an illustration showing a protective envelope being secured to a base of a fired cartridge case collector, according to one or more embodiments presented.

Referring now to FIGS. 1, 6, and 8, the base 110 of the fired cartridge case collector 100 may include a holding tab 114 configured to allow a user to securely grasp the base 110 of the fired cartridge case collector 100. Such a feature may provide the user with a secure grasp of the fired cartridge case collector 100 before, during, or after collection of the fired cartridge case 120. In embodiments, the holding tab 114 may be substantially triangular. In one or more embodiments, the holding tab 114 may also include a perforation 115. Perforation 115 may allow for an identification tag to be attached to the fired cartridge case collector 100 for identification of the fired cartridge case collector 100 during collection, testing, storage, and the like.

Referring now to FIGS. 1, 3, 4, 7, and 8, the second end 134 of the protective envelope 130 may include one or more breathable perforations 133. The breathable perforations 133 may allow for atmospheric air to contact the fired cartridge case 120 and allow for evaporation of any moisture present on the exterior surface 122. The one or more breathable perforations 133 may also allow for cursory examination of a fired cartridge case 120 without having to remove the protective envelope 130 from the base 110. In one or more embodiments, and as shown in FIGS. 6 and 8, the base 110 may include one or more breathable perforations 116 for at least the same reasons previously described.

In embodiments, one or more components of the fired cartridge case collector 100 may be formed from a soft plastic. As used herein, the term "soft plastic" includes any synthetic material made from organic polymers, in which the synthetic material has a Brinell Hardness Number (BHN) of less than 30, such as less than 25, less than 20, less than 15, less than 12.5, or less than 10. Example embodiments of soft plastics that may be used to form one or more components of the fired cartridge case collector 100 include polypropylene, polyethylene, acrylonitrile butadiene styrene, or combinations thereof. Soft plastics may be preferred in order to prevent the fired cartridge case 120 from being scratched, altered, or otherwise tarnished during collection or transportation of the fired cartridge case collector 100.

A method for collecting the fired cartridge case 120 with the fired cartridge case collector 100, according to any of the previously described embodiments, may include contacting an interior surface 126 of the fired cartridge case 120 with the collection post 112 of the fired cartridge case collector 100, where the collection post 112 is positioned on the base 110. The method may further include inverting the base 110 of the fired cartridge case collector 100, such that the fired cartridge case 120 may become suspended on the collection post 112. The method may further include securing the protective envelope 130 having the first end 132 and the second end 134 opposite the first end 132 onto the base 110 of the fired cartridge case collector 100, without causing contact between an interior surface 136 of the protective envelope 130 and an exterior surface 122 of the fired cartridge case 120. Without being bound by theory, it is believed that this method may reduce or eliminate any DNA contamination of the fired cartridge case 120, which may result from typical methods for collecting a fired cartridge case.

Having described the subject matter of the present disclosure in detail and by reference to specific embodiments, it is noted that the various details described in the present disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims. More specifically, although some aspects of the present disclosure are identified as particularly advantageous, it is contemplated that the present disclosure is not necessarily limited to these aspects.

What is claimed is:

1. A fired cartridge case collector, comprising:
   a base having a collection post, wherein the collection post of the base is configured to collect and suspend a fired cartridge case without causing contact to an exterior surface of the fired cartridge case; and
   a protective envelope having a first end and a second end opposite the first end, wherein the first end of the protective envelope is configured to be removably secured to the base, and the protective envelope is configured to prevent contact between an interior surface of the protective envelope and the exterior surface of the fired cartridge case while the protective envelope is removably secured to the base; and
   wherein at least one of said base and said protective envelope includes breathable perforations.

2. The fired cartridge case collector of claim 1, wherein the second end of the protective envelope includes a securing post configured to contact a firing pin of the fired cartridge case, thereby constraining movement of the fired cartridge case.

3. The fired cartridge case collector of claim 2, wherein a surface area of the securing post in contact with the fired cartridge case is substantially equal to a surface area of the firing pin.

4. The fired cartridge case collector of claim 2, wherein the collection post is substantially cylindrical and the securing post is substantially cylindrical.

5. The fired cartridge case collector of claim 4, wherein a diameter of the collection post is greater than a diameter of the securing post.

6. The fired cartridge case collector of claim 1, wherein the fired cartridge case comprises a fired rifle cartridge case, a fired handgun cartridge case, a fired shotgun cartridge case, a fired machine gun cartridge case, or fired carbine cartridge case.

7. The fired cartridge case collector of claim 1, wherein the protective envelope is substantially cylindrical.

8. The fired cartridge case collector of claim 1, wherein the collection post is substantially cylindrical.

9. The fired cartridge case collector of claim 1, wherein the base further comprises a holding tab configured to allow a user to securely grasp the base.

10. The fired cartridge case collector of claim 9, wherein said holding tab includes a perforation for attachment of an identification tag.

11. The fired cartridge case collector of claim 1, wherein the second end of the protective envelope includes said one or more breathable perforations.

12. The fired cartridge case collector of claim 1, wherein said base includes said one or more breathable perforations.

13. The fired cartridge case collector of claim 1, wherein both the protective envelope and the base include one or more breathable perforations.

14. A method for collecting a fired cartridge case with a fired cartridge case collector, the method comprising:
- contacting an interior surface of a fired cartridge case with a collection post of the fired cartridge case collector, wherein the collection post is positioned on a base;
- inverting the base of the fired cartridge case collector, such that the fired cartridge case becomes suspended on the collection post; and
- securing a protective envelope having a first end and a second end opposite the first end onto the base of the fired cartridge case collector by securing the first end onto the base, without causing contact between an interior surface of the protective envelope and an exterior surface of the fired cartridge case.

15. The method of claim 14, wherein the second end of the protective envelope includes a securing post configured to contact a firing pin of the fired cartridge case, thereby constraining movement of the fired cartridge case after the securing step is complete.

16. The method of claim 15, wherein a surface area of the securing post in contact with the fired cartridge case is substantially equal to a surface area of the firing pin.

17. The method of claim 15, wherein the collection post is substantially cylindrical and the securing post is substantially cylindrical.

18. The method of claim 17, wherein a diameter of the collection post is greater than a diameter of the securing post.

19. The method of claim 14, wherein the fired cartridge case comprises a fired rifle cartridge case, a fired handgun cartridge case, a fired shotgun cartridge case, a fired machine gun cartridge case, or a fired carbine cartridge case.

20. The method of claim 14, wherein the protective envelope of the fired cartridge case collector is substantially cylindrical.

21. The method of claim 14, wherein the collection post is substantially cylindrical.

22. The method of claim 14, wherein the base further comprises a holding tab configured to allow a user to securely grasp the base during the one or more of the contacting step, the inverting step, and the securing step.

23. The method of claim 22, wherein said holding tab includes a perforation for attachment of an identification tag.

24. The method of claim 14, wherein the second end of the protective envelope includes one or more breathable perforations.

25. The method of claim 14, wherein said base includes one or more breathable perforations.

\* \* \* \* \*